US012612160B2

(12) United States Patent
Khabrani

(10) Patent No.: US 12,612,160 B2
(45) Date of Patent: *Apr. 28, 2026

(54) TECHNIQUES TO LOCK AND UNLOCK DISPLAYS OF VEHICLE ENTERTAINMENT SYSTEMS FOR COMMERCIAL PASSENGER VEHICLES

(71) Applicant: Panasonic Avionics Corporation, Irvine, CA (US)

(72) Inventor: Gurmukh Khabrani, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/674,117

(22) Filed: May 24, 2024

(65) Prior Publication Data

US 2024/0308664 A1    Sep. 19, 2024

Related U.S. Application Data

(63) Continuation of application No. 17/519,893, filed on Nov. 5, 2021, now Pat. No. 11,993,382.

(51) Int. Cl.
| | |
|---|---|
| *B64D 11/00* | (2006.01) |
| *H04L 9/06* | (2006.01) |
| *H04L 9/08* | (2006.01) |
| *H04L 9/32* | (2006.01) |
| *H04W 4/80* | (2018.01) |

(52) U.S. Cl.
CPC ...... *B64D 11/00155* (2014.12); *H04L 9/0643* (2013.01); *H04L 9/0861* (2013.01); *H04L 9/3247* (2013.01); *H04W 4/80* (2018.02)

(58) Field of Classification Search
None
See application file for complete search history.

(56) References Cited

U.S. PATENT DOCUMENTS

| | | |
|---|---|---|
| 2010/0257475 A1 | 10/2010 | Smith et al. |
| 2021/0337460 A1 | 10/2021 | Breaux et al. |
| 2022/0089123 A1 | 3/2022 | Delong et al. |
| 2023/0144008 A1 | 5/2023 | Khabrani |

*Primary Examiner* — Peter Hoang
(74) *Attorney, Agent, or Firm* — Perkins Coie LLP

(57) ABSTRACT

A display in a commercial passenger vehicle can an option to be locked or unlock to enhance security. An example system for securing an in-vehicle entertainment (IVE) display in a commercial passenger vehicle comprises a mobile device and a computer. The mobile device comprises a first processor configured to secure a display located in the commercial passenger vehicle, where the first processor is configured to: obtain a payload; generate a first digitally signed payload as a first output of a first mathematical computation performed on the payload with a secret key; and send a first message comprising the first digitally signed payload and a lock command to instruct the display to lock the display. The computer is communicably coupled with the display and comprises a second processor configured to send a first instruction to cause the display to lock in response to a reception of the lock command.

20 Claims, 9 Drawing Sheets

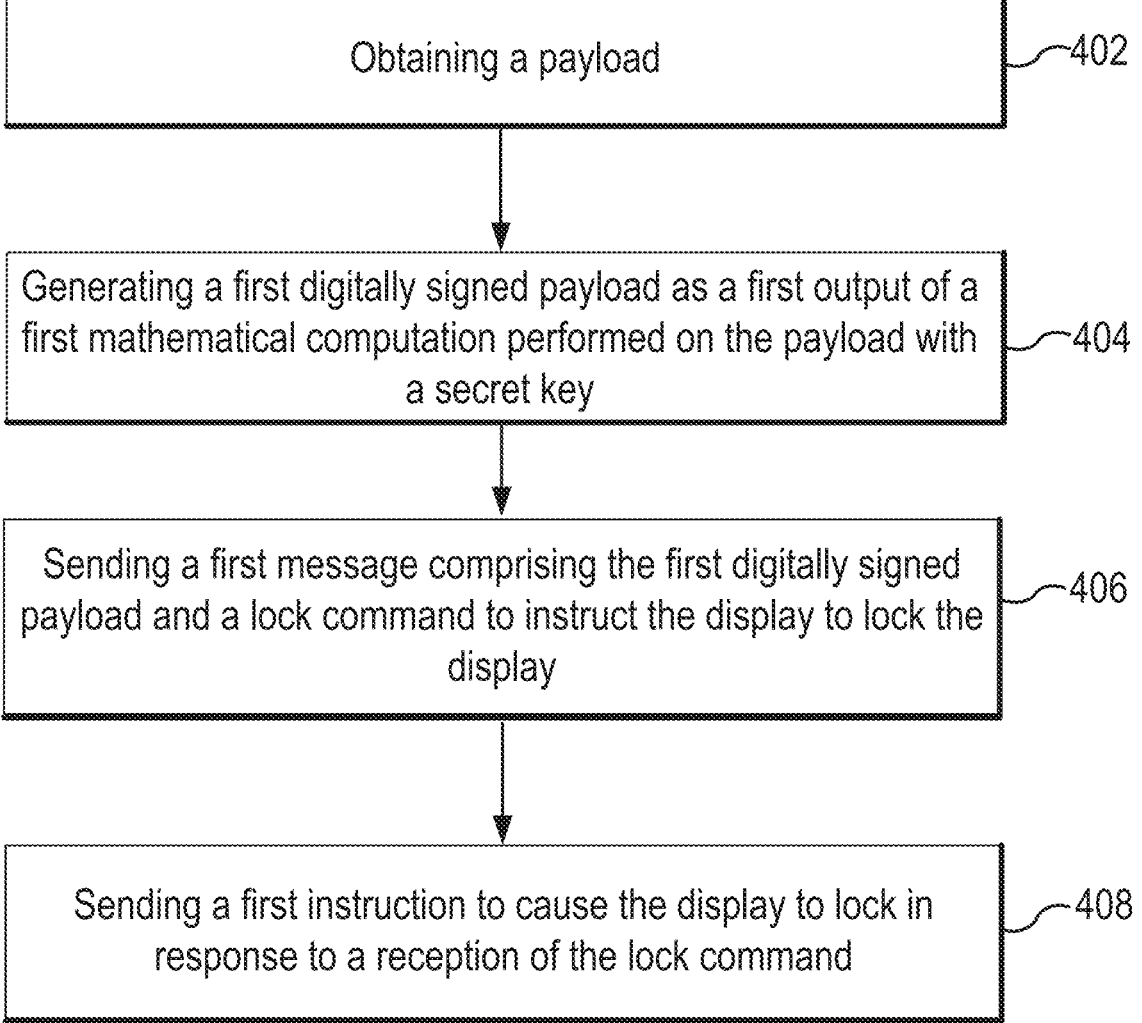

Obtaining a payload ⟶ 402

Generating a first digitally signed payload as a first output of a first mathematical computation performed on the payload with a secret key ⟶ 404

Sending a first message comprising the first digitally signed payload and a lock command to instruct the display to lock the display ⟶ 406

Sending a first instruction to cause the display to lock in response to a reception of the lock command ⟶ 408

*FIG. 4A*

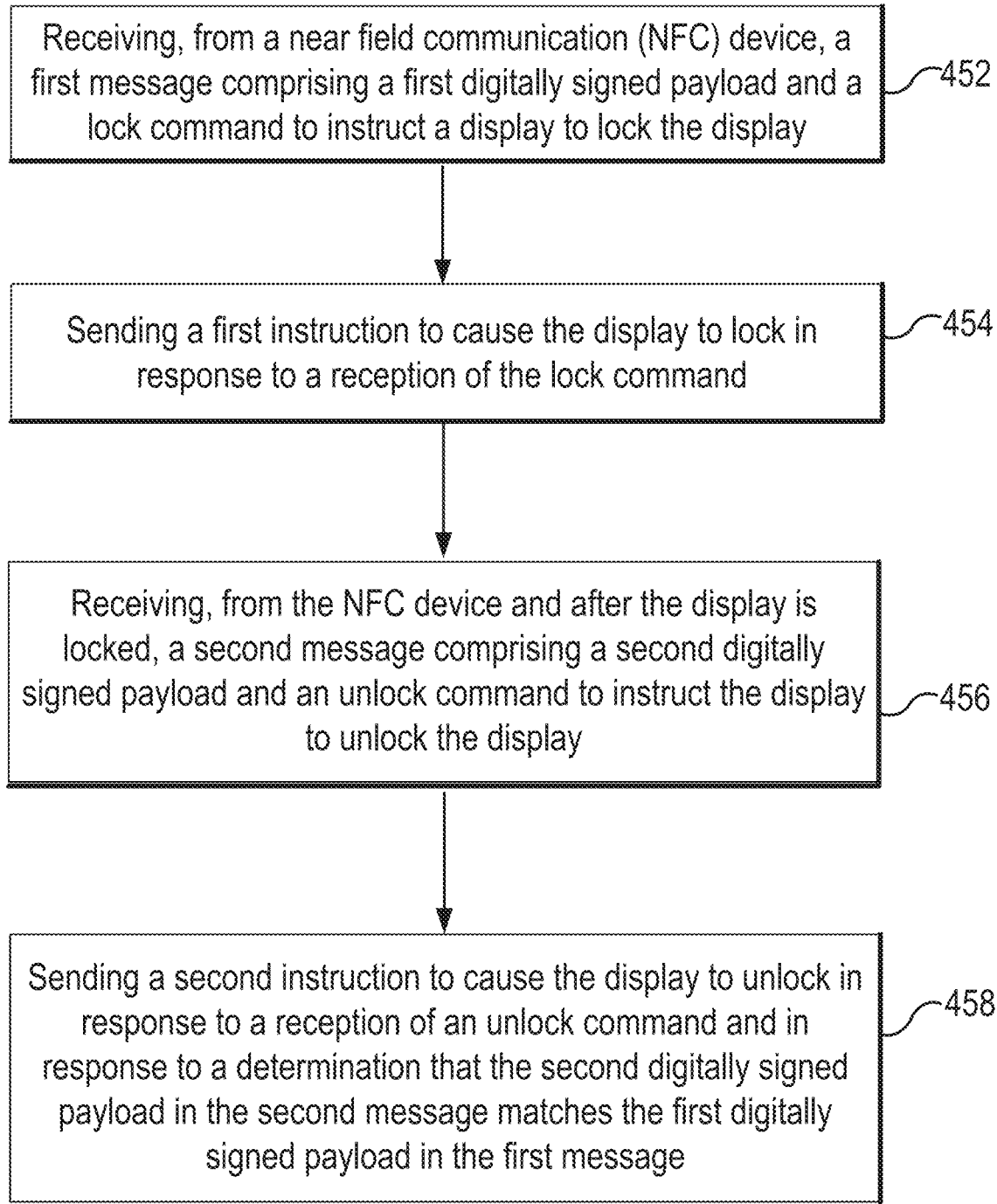

Receiving, from a near field communication (NFC) device, a first message comprising a first digitally signed payload and a lock command to instruct a display to lock the display ⟋452

Sending a first instruction to cause the display to lock in response to a reception of the lock command ⟋454

Receiving, from the NFC device and after the display is locked, a second message comprising a second digitally signed payload and an unlock command to instruct the display to unlock the display ⟋456

Sending a second instruction to cause the display to unlock in response to a reception of an unlock command and in response to a determination that the second digitally signed payload in the second message matches the first digitally signed payload in the first message ⟋458

*FIG. 4B*

TECHNIQUES TO LOCK AND UNLOCK DISPLAYS OF VEHICLE ENTERTAINMENT SYSTEMS FOR COMMERCIAL PASSENGER VEHICLES

CROSS REFERENCE TO RELATED APPLICATIONS

This application is a continuation of and claims benefit of priority to U.S. application Ser. No. 17/519,893 filed on Nov. 5, 2021. The aforementioned Patent Application is incorporated by reference herein in its entirety.

TECHNICAL FIELD

This document is directed generally to systems, methods, and apparatus to lock displays of an in-vehicle entertainment system for a commercial passenger vehicle.

BACKGROUND

Commercial travel has evolved to provide entertainment options to passengers traveling to their destinations. For example, in an airplane or train, entertainment options are provided on displays located on the back of seats, where the displays can enable passengers to watch movies or television shows as they travel to their destinations. The displays can also provide travel related information to the passengers. For example, passengers can view a map with the current location of the airplane or train and an estimated time of arrival to their destinations. Thus, in-vehicle entertainment systems can be designed to provide passengers with a positive travel experience.

SUMMARY

This patent document describes exemplary systems, methods, and apparatus to allow users to lock and/or unlock their displays associated with an in-vehicle entertainment system in a commercial passenger vehicle.

An example system for securing an in-vehicle entertainment (IVE) display in a commercial passenger vehicle, the system comprising: a mobile device located in the commercial passenger vehicle and comprising a first processor configured to secure a display located in the commercial passenger vehicle, where the first processor is configured to: obtain a payload; generate a first digitally signed payload as a first output of a first mathematical computation performed on the payload with a secret key; and send a first message comprising the first digitally signed payload and a lock command to instruct the display to lock the display, where the display is located behind a headrest of a seat in the commercial passenger vehicle; a computer located in the commercial passenger vehicle, where the computer is communicably coupled with the display and comprises a second processor configured to: send a first instruction to cause the display to lock in response to a reception of the lock command.

In some embodiments, the mobile device comprising the first processor is further configured to: send, after the display is locked, a second message comprising a second digitally signed payload and an unlock command to instruct the display to unlock the display, where the second digitally signed payload is generated as a second output of a second mathematical computation performed on the payload with the secret key, where the first mathematical computation is performed at a first time that is earlier in time than a second time when the second mathematical computation is performed; and the computer comprising the second processor is further configured to: send a second instruction to cause the display to unlock in response to a reception of the unlock command. In some embodiments, the first processor of the mobile device is configured to not store or to discard the payload in the mobile device after the first digitally signed payload is generated.

In some embodiments, the first mathematical computation and the second mathematical computation includes a performance of a hash function using the payload the secret key. In some embodiments, when the display is locked, the second processor of the computer is configured to show on the display a volume adjustment menu to adjust an output volume of an audio or video content or to show on the display a brightness adjustment menu to adjust brightness of the display. In some embodiments, when the display is locked, the second processor of the computer is configured to show on the display a reading light control menu to control a light. In some embodiments, the payload is obtained from the computer by the first processor of the mobile device, the first processor being further configured to: transmit, using a first near field communication (NFC) device located in the mobile device, an application identifier (AID) to a second NFC device located in the display or located in another seat; and where the payload is obtained by the first NFC device from the second NFC device in response to the transmit the AID.

In some embodiments, the first message comprising the first digitally signed payload, the lock command, and the AID is sent by the first NFC device in the mobile device to the second NFC device in the display or in the another seat, and the second message comprising the second digitally signed payload, the unlock command, and the AID is sent by the first NFC device in the mobile device to the second NFC device in the display or in the another seat. In some embodiments, the display is caused to unlock by the second processor of the computer that is further configured to: receive the second message; and where the second instruction to cause the display to unlock is sent in response to the receive the unlock command and in response to a determination that the second digitally signed payload in the second message matches or is same as the first digitally signed payload in the first message. In some embodiments, the first NFC device is configured to operate in an NFC reader mode and the second NFC device is configured to operate in a host-based card emulation mode before the payload is obtained by the first NFC device.

In some embodiments, after the payload is obtained, the first NFC device is configured to operate in a host-based card emulation mode and the second NFC device is configured to operate in an NFC reader mode. In some embodiments, the payload is obtained from a server located in the commercial passenger vehicle by the first processor of the mobile device, the first processor being further configured to: scan a unique code displayed on the display, where the unique code provides an address of a webpage unique to the display; and cause a screen of the mobile device to show the webpage whose address is provided by the unique code, where the webpage is hosted on the server; where the payload is obtained from the webpage, and where the payload is hidden in the webpage. In some embodiments, the first message comprising the first digitally signed payload and the lock command is sent by the mobile device to the server from the address of the webpage that is unique to the display, and where the second message comprising the second digitally signed payload and the unlock command is sent is sent by the mobile device to the server from the address of the webpage that is unique to the display.

In some embodiments, the server includes a third processor that is configured to: receive, from the mobile device, the first message comprising the first digitally signed payload and the lock command; and send, in response to the receive the first message, a third message to the computer associated with the display, where the third message comprises the lock command, and where the third message is sent to the computer based on the address of the webpage that is unique to the display. In some embodiments, the server includes a third processor that is configured to: receive, from the mobile device, the second message comprising the second digitally signed payload and the unlock command; and send, upon determining that the second digitally signed payload matches or is same as the first digitally signed payload, a fourth message to the computer associated with the display, where the fourth message comprises the unlock command, and where the fourth message is sent to the computer based on the address of the webpage that is unique to the display.

An example computer configured to secure an in-vehicle entertainment (IVE) display, the computer comprising a processor configured to: receive, from a near field communication (NFC) device, a first message comprising a first digitally signed payload and a lock command to instruct a display to lock the display, where the computer and the display are located in a commercial passenger vehicle; send a first instruction to cause the display to lock in response to a reception of the lock command; receive, from the NFC device and after the display is locked, a second message comprising a second digitally signed payload and an unlock command to instruct the display to unlock the display; and send a second instruction to cause the display to unlock in response to a reception of an unlock command and in response to a determination that the second digitally signed payload in the second message matches the first digitally signed payload in the first message.

In some embodiments, the processor of the computer is configured to: receive an application identifier (AID) from a mobile device; and transmit, in response to the receive the AID, a payload to the mobile device, where the first digitally signed payload is a first output of a first mathematical computation that includes the payload and a secret key of the mobile device, and where the second digitally signed payload is a second output of a second mathematical computation that includes the payload and the secret key of the mobile device. In some embodiments, where the first message comprising the first digitally signed payload, the lock command, and the AID is received by the NFC device, and the second message comprising the second digitally signed payload, the unlock command, and the AID is received by the NFC device. In some embodiments, when the display is locked, the processor of the computer is further configured to show on the display a volume adjustment menu to adjust an output volume of an audio or video content or to show on the display a brightness adjustment menu to adjust brightness of the display. In some embodiments, the second digitally signed payload in the second message is determined to match the first digitally signed payload in the first message by the processor configured to determine that the second digitally signed payload is same as the first digitally signed payload.

In yet another exemplary aspect, the above-described methods are embodied in the form of processor-executable code and stored in a non-transitory computer-readable program medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 4A shows an example flowchart of operations performed by a computer and mobile device to lock and/or unlock a display on a commercial passenger vehicle.

FIG. 4B shows an example flowchart of operations performed by a computer to lock and/or unlock a display on a commercial passenger vehicle.

DETAILED DESCRIPTION

An in-vehicle entertainment (IVE) system that can send entertainment content (e.g., audio, movies, television shows, or other videos) to displays located on the back of a headrest of the seats (e.g., known as seatback monitors) in the commercial passenger vehicle. A display located on the back of the headrest of the seat can be referred to as seatback monitor or an IVE display and may be electrically connected to a computer that may be located in the seat (e.g., bottom of the seat). The computer of the seatback monitor may include may utilize a one or more software programs when displaying graphical content on a display screen and outputting sound to one or more output ports, e.g., headphone jack(s). The seatback monitor and the associated computer can be considered a media playback device.

IVE displays or seatback monitors can offer entertainment and travel experience that are specific to passengers while allowing passengers to provide data about themselves which may be considered personal information. For example, a passenger can use an IVE display to enter the passenger's preferences for music or movies or the passenger can use the IVE display to enter email address or dietary needs. In another example, the passenger may fill out a survey related to the passenger's travel experience using the IVE display where the answers related to the survey may include personal information. In yet another example, the passenger can use the IVE display to purchase products by entering credit card information or to track an order to keep a tab open for future orders in the passenger vehicle. Thus, an IVE system may offer more features to enhance travel experience by collecting a passenger's preferences or information so that when the passenger travels again in the future the IVE system can provide travel related options (e.g., meal) and/or entertainment options to the passenger based on the passenger's preferences or information.

A technical problem with current IVE systems is that an IVE display used by a passenger may be accessible by another passenger who may obtain the passenger's personal information when the passenger is sleeping or is not at the passenger's seat. Thus, this patent document describes example techniques to lock a IVE display using software by, for example, exchanging digitally signed information between the computer associated with the IVE display and a passenger's mobile device.

Figure 1:
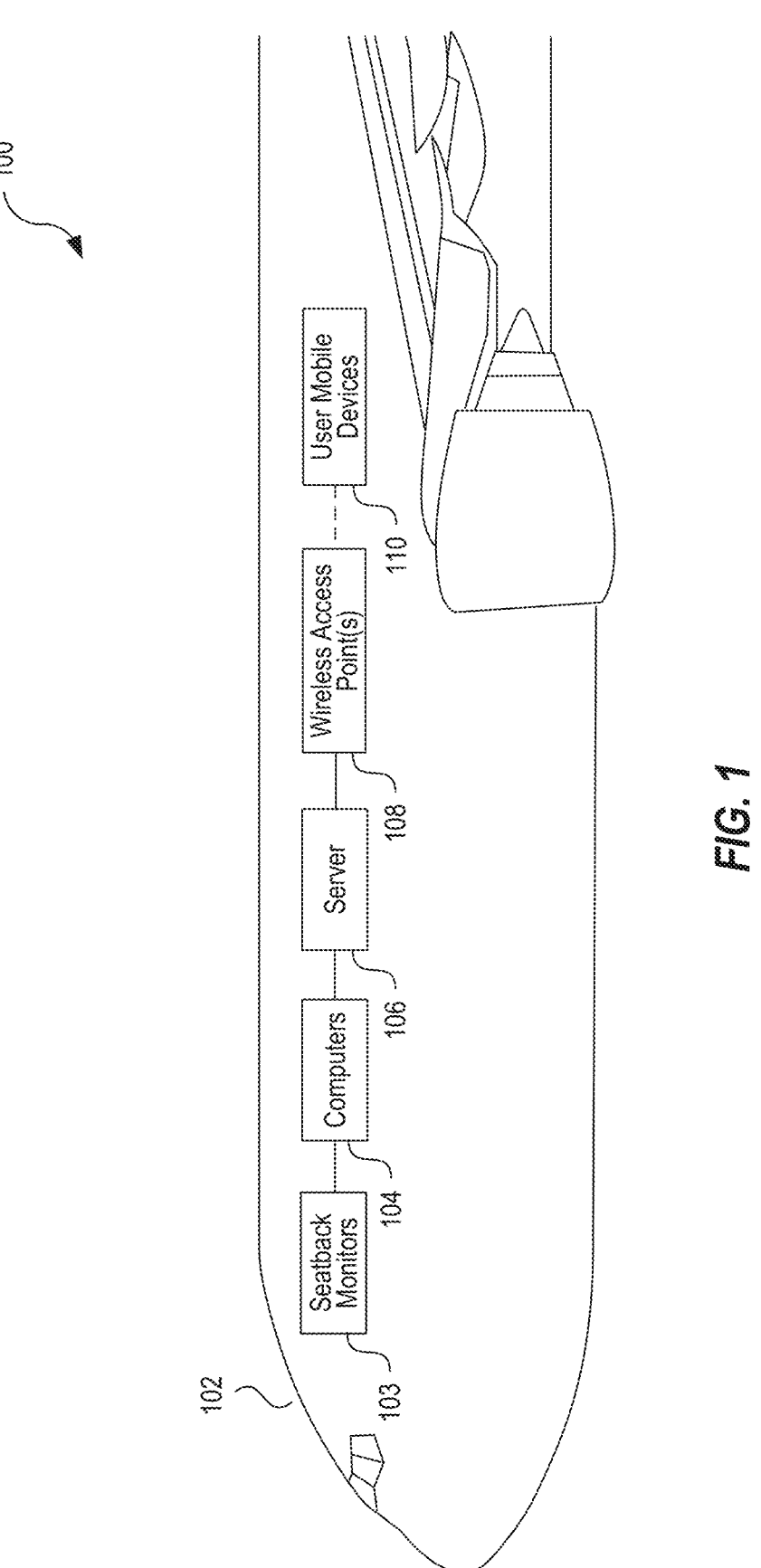
FIG. 1 shows an exemplary overview of an in-vehicle entertainment (IVE) system installed in an airplane.

FIG. 1 shows an exemplary overview of an IVE system 100 installed in an airplane 102. The IVE system includes a plurality of seatback monitors 103 that is communicably coupled to a plurality of computers 104, where each computer may be located in a seat below one or more seatback monitors. For example, one computer may be communicably coupled to one or more seatback monitors located in a row in the airplane 102 so that the computer may be located in a seat below the one or more seatback monitors. In another example, each seatback monitor may be communicably coupled to a computer so that each computer may be located in the seat where the seatback monitor is located. Each of the plurality of computers 104 may include an ethernet connector which allows the plurality of computers 104 to be communicably coupled to the server 106 via, for example, an Ethernet switch. The server 106 may be communicably coupled (e.g., via Ethernet switch) to one or more wireless access points 108. Thus, in such embodiments, passengers may use their mobile devices 110 to connect to the one or more wireless access points 108 so that the passengers' mobile devices 110 can communicate with the plurality of seatback monitors 103 via the server 106.

In some embodiments, each of the plurality of seatback monitors 103 may include a near-field communication (NFC) device so that a passenger's mobile device 110 may directly communicate with a computer associated with the seatback monitor via the NFC device. In some embodiments, each seat may include an NFC device (e.g., located on or in the armrest of each seat) that is communicably coupled to a computer. In such embodiments, an NFC device located that may be located in a first seat where a passenger may be seated may be used to secure (e.g., lock/unlock) the passenger's display that is located in another seat immediately in front of the first seat. for example, a passenger's mobile device 110 may communicate with a computer via an NFC device located in a first seat, where the computer is communicably coupled with the seatback monitor located on a second seat immediately in front of the first seat.

Figure 2:
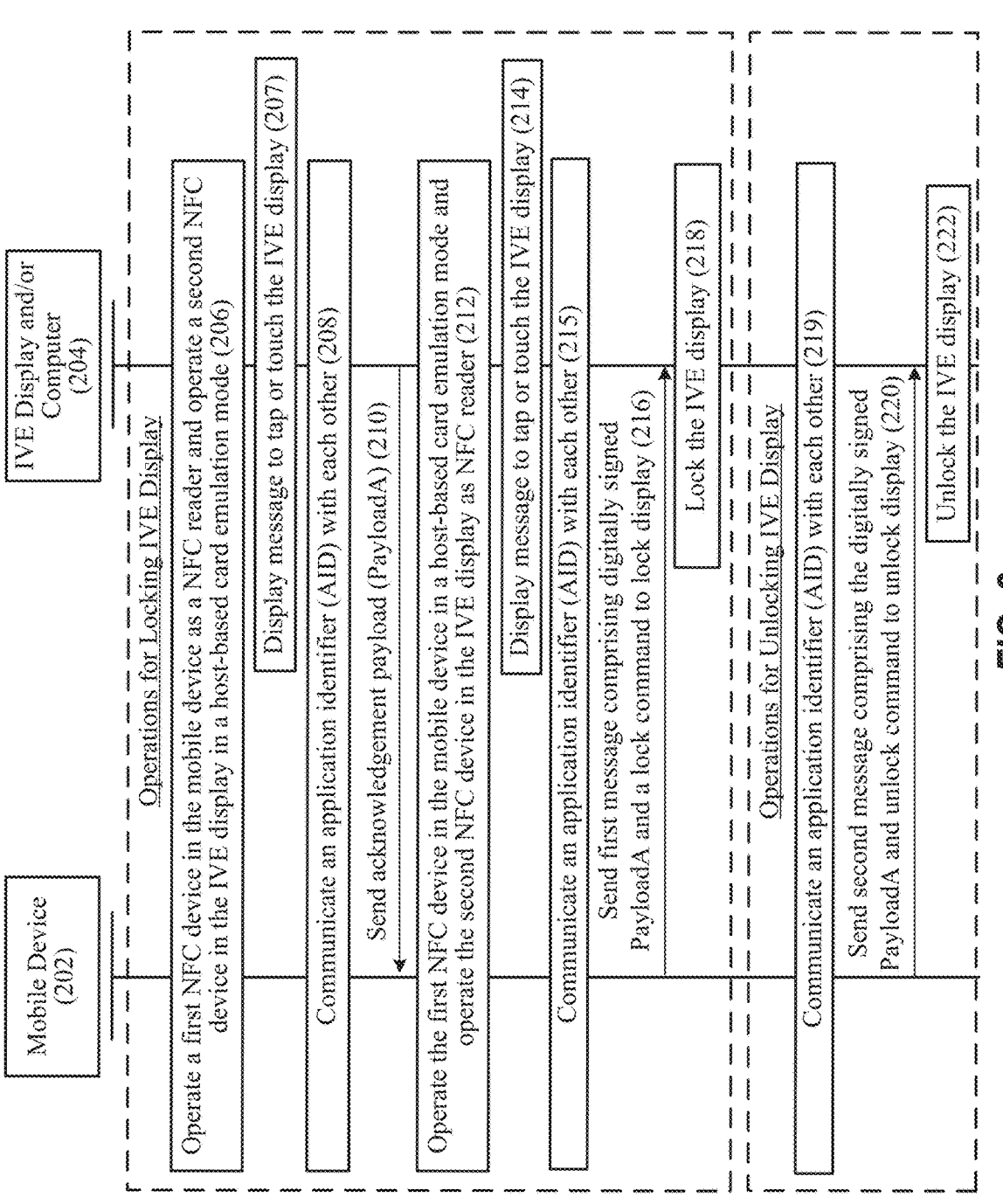
FIGS. 2 and 3 show two example flowcharts to lock and unlock a passenger's IVE display.
Figure 3:
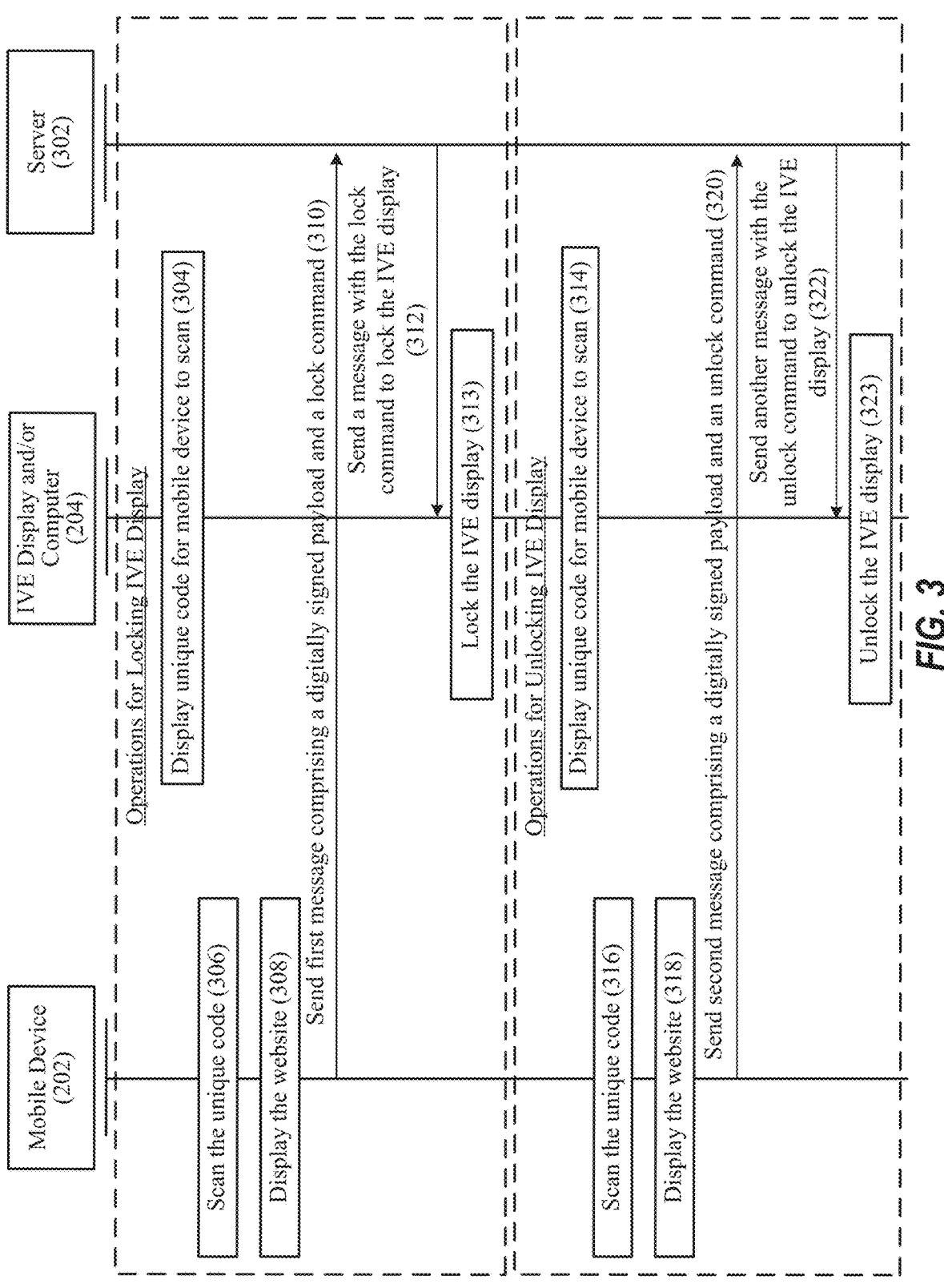

FIGS. 2 and 3 show two example flowcharts to lock and unlock a passenger's IVE display. The flowchart shown in FIG. 2 uses NFC technology and the flowchart shown in FIG. 3 uses Wi-Fi technology. One of the technical advantages of the flowcharts of FIGS. 2 and 3 is that a passenger can lock and unlock the IVE display without entering a passcode or a password via the IVE display so that other passengers cannot easily lock and unlock the passenger's IVE display using the passcode or the password. While this patent document uses NFC and Wi-Fi technology to explain the locking and unlocking techniques for the seatback display, other technologies can be employed to perform the techniques described in this patent document. For example, a mobile device may use infrared (IR) technology instead of NFC technology to communicate with an IR receiver which may be located on the seatback display. In another example, a mobile device may use cellular technology instead of Wi-Fi technology to communicate with a seatback display via the server that may communicably coupled to a satellite. The example techniques shown in Sections A and B in this patent document are shown for case of understanding. The techniques shown in Section A can be applied to Section B and vice versa.

A. Example Locking and Unlocking Techniques Using NFC Technology

In FIG. 2, an IVE display is locked for the first time by performing operations 206 to 218, and the IVE display is unlocked (after being locked) by performing operations 219 to 222.

At operation 206, the mobile device 202 opens a software application that is stored in the mobile device 202. The software application in the mobile device 202 may perform operations associated with a first lock/unlock module (shown as 525 in FIG. 5) as further described in this patent application. The mobile device 202 may also include a first NFC device (shown as 530 in FIG. 5) that the first lock/unlock module initially operates in an NFC reader mode at operation 206. At operation 206, a second NFC device (shown as 630 in FIG. 6) located in the IVE display 204 or in an armrest of a seat or in the vicinity of the IVE display is initially operated in a host-based card emulation mode by a second lock/unlock module (shown as 625 in FIG. 6) of the computer 204. The computer 204 is communicably coupled to the IVE display may store and operate another software application whose operations are described in this patent application as being associated with the second lock/unlock module.

At operation 207, the computer 204 displays a message to indicate to the passenger to tap or touch the IVE display (e.g., with their device). At operation 208, first and second lock/unlock modules communicate with each other via the first NFC device in the mobile device 202 and the second NFC device in the IVE display 204 or in the armrest of the seat or in the vicinity of the IVE display using, for example, a pre-determined application identifier (AID). The AID facilitates communication using the first and second NFC devices between the IVE display and the mobile device. In some embodiments, the AID may be a custom AID, where the AID is sent by the first lock/unlock module in the mobile device 202 to the second lock/unlock module in the computer 204 at operation 208.

At operation 210, when the computer 204 determines that a person or a device has physically tapped the second NFC device or has physically tapped or touched the IVE display 204, the second lock/unlock module that is associated with (or registered for) the AID is triggered to operate. When the second lock/unlock module in the computer 204 receives an indication of the tap on the second NFC device or the touch on the IVE display 204, the second lock/unlock module sends an acknowledgement payload (referred to as PayloadA) to first lock/unlock module in the mobile device 202 at operation 210.

At operation 212, after the second lock/unlock module in the computer 204 sends the acknowledgement payload and after the first lock/unlock module in the mobile device 202 receives the acknowledgement payload, the second lock/unlock module in the computer 204 sends a signal to the second NFC device in the IVE display 204 or in the armrest of the seat or in the vicinity of the IVE display to operate in a NFC reader mode, and the first lock/unlock module in the mobile device 202 sends a signal to the first NFC device in the mobile display 202 to operate in the host-based card emulation mode. The first NFC device in the mobile display 202 is operated in the NFC reader mode until it receives the acknowledgement payload at operation 212. After the computer 204 transmits the acknowledgement payload and after the mobile device 202 receives the acknowledgement payload, the mobile device 202 and the computer 204 switch modes to operate in a host-based card emulation mode and in the NFC reader mode, respectively, at least because the mobile device 202 may send a digitally signed PayloadA to the computer 204 as explained in operation 216.

At operation 214, a person may be prompted to tap the second NFC device or touch the IVE display using the IVE display's graphical user interface (GUI) thorough which a message to tap or touch the IVE display can be displayed. At operation 214, the second lock/unlock module does not display a passcode or password for a user to enter. As mentioned in this patent document, one of the technical advantages of the example flowchart of FIG. 2 is that a passenger can lock and unlock the IVE display without entering a passcode or a password via the IVE display so that other passengers cannot easily lock and unlock the passenger's IVE display using the passcode or the password.

At operation 215, when the first lock/unlock module determines that the first NFC device is in proximity of the second NFC device (e.g., by determining that the first NFC device and the second NFC device are communicating the AID with each other), then at operation 216, the first lock/unlock module sends a first message using the AID and via the first NFC device to the second NFC device. The first lock/unlock module in the mobile device 202 may generate the first message to include a header that may include the AID. The AID in the header indicates that the first lock/unlock module in the mobile device 202 wants to communicate with the second lock/unlock module in the computer 204 associated with the AID. The first message may also include a digitally signed PayloadA, where the first lock/unlock module in the mobile device 202 uses a secret key to digitally sign the PayloadA and adds the digitally signed PayloadA to the first message. The first lock/unlock module may generate and store the secret key in the mobile device 202 and only the first lock/unlock module may know or access the secret key.

The first lock/unlock module in the mobile device 202 can generate the digitally signed PayloadA by performing a mathematical calculation, such as by using a hash function to hash PayloadA using the secret key. The output generated by the mathematical calculation can be considered a digitally signed PayloadA. After the digitally signed PayloadA is generated at operation 216, the first lock/unlock module deletes the PayloadA and does not store PayloadA on the mobile device. The PayloadA that is digitally signed is the same as the one provided to the first lock/unlock module in the mobile device 202 at operation 210. The first message may also include a lock command that indicates to the second lock/unlock module in computer 204 to lock the IVE display.

Figure 8:
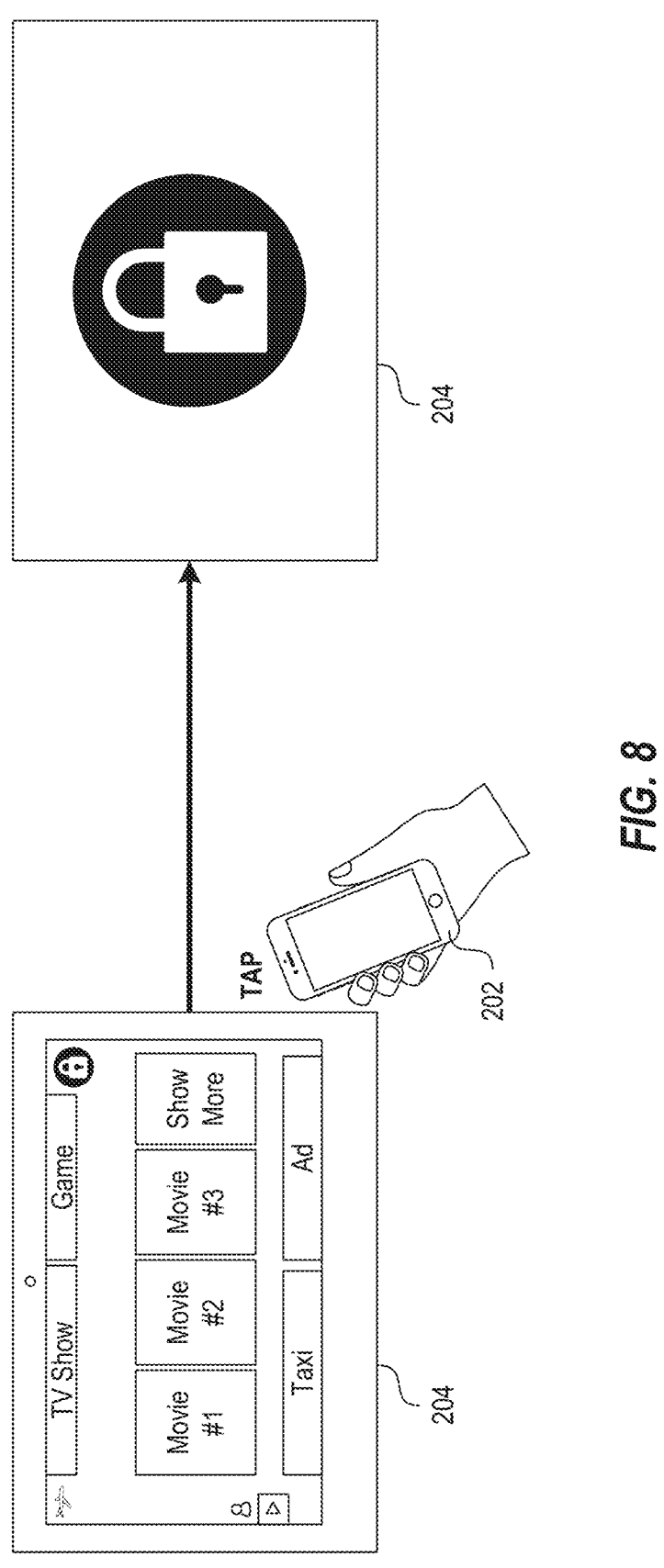
FIG. 8 shows an example scenario where an IVE display is locked using a mobile device.

At operation 218, the second lock/unlock module in the computer 204 locks the IVE display in response to determining that the first message comprises the lock command to lock. A locked IVE display may show a lock icon on the display with a black background that does not show any of the entertainment content (e.g., as shown in the IVE display on the right-hand side of FIG. 8), and/or the locked IVE display may blur the entertainment content so that the entertainment content may not be seen by any of the passengers. The second lock/unlock module in the computer 204 may store the digitally signed PayloadA in the computer 204 as long as the IVE display is locked. FIG. 8 shows an example scenario where an IVE display shown on the right-hand side of FIG. 8 is locked when a person uses a mobile device 202 to tap or touch the lock icon on the IVE display 204 shown on the left-hand side of FIG. 8.

In some embodiments, the locked IVE display prevents the passenger or another passenger from accessing most of the content on the IVE display (e.g., the IVE display does not show entertainment content, etc.,). In some embodiments, the locked IVE display prevents the passenger or another passenger from accessing the functionalities of the computer 204 (e.g., the IVE display and/or computer cannot perform payment related operations or display or collect passenger information, etc.,). In some embodiments, certain functionalities on the IVE display may still be operated by the passenger. For example, when the IVE display is locked, the second lock/unlock module in the computer 204 may configure the GUI of the IVE display to show a volume adjustment menu to allow a passenger to adjust an output volume of an audio or video content via the GUI of the IVE display. In another example, when the IVE display is locked, the second lock/unlock module in the computer 204 may allow important audio from the passenger vehicle's staff (e.g., captain of airplane or member of cabin crew or train operator) to pass through to the headphone jack associated with the IVE display. In another example, when the IVE display is locked, the second lock/unlock module in the computer 204 may configure the GUI of the IVE display to show a brightness adjustment menu to adjust brightness of the display or to show a reading light control menu to control a light.

At operation 219, when the first lock/unlock module determines that the first NFC device is in proximity of the second NFC device (e.g., by determining that the first NFC device and the second NFC device are communicating the AID with each other), the first lock/unlock module sends a second message at operation 220 via the first NFC device to the second NFC device in the IVE display 204 or in the armrest of the seat or in the vicinity of the IVE display, where the second message includes the AID, the digitally signed PayloadA, and an unlock command. The first lock/unlock module in the mobile device 202 may generate the second message to include the AID in a header of the second message and by including the digitally signed PayloadA in the second message. After the digitally signed PayloadA is generated at operation 220, the first lock/unlock module deletes the PayloadA and does not store PayloadA on the mobile device. The unlock command indicates to the second lock/unlock module in the computer 204 to unlock the IVE display.

At operation 222, the second lock/unlock module in the computer 204 unlocks the IVE display upon determining that the received second message includes the unlock command and that the digitally signed PayloadA in the second message matches (e.g., is the same as) the digitally signed PayloadA received in the first message. After the IVE display 204 is unlocked at operation 222, if a person wants to lock the IVE display 204, the set of operations to re-lock the IVE display can start at operation 206. In some embodiments, the secret key that may be generated at operation 216 by the first lock/unlock module of the mobile device 202 when a person locks the IVE screen for a first time may be different than another secret key that may be generated at operation 216 by the first lock/unlock module of the mobile device 202 when the person locks the IVE screen for a second time that is later than the first time. Thus, in some embodiments, the secret key that may be generated by the first lock/unlock module can be different every time the operations for locking IVE display is performed.

B. Example Locking and Unlocking Techniques Using Wi-Fi Technology

In FIG. 3, an IVE display is locked by performing operations 304 to 313, and the IVE display is unlocked (after being locked) by performing operations 314 to 323.

Prior to operation 304, the IVE display 204 displays a lock icon (e.g., in a corner of the IVE display 204 as shown in the IVE display shown on the left-hand side of FIG. 8). At operation 304, when a second lock/unlock module of the computer 204 determines that a person has touched the lock icon on the IVE display 204, the computer 204 displays a unique code for the mobile device 202 to scan. The unique code may include information that indicates to the mobile device 202 an address (e.g., a uniform resource locator (URL)) for a webpage hosted on a server 302 (which may be same as server 106 in FIG. 1) located in the passenger vehicle, and the address may include a unique identifier of the IVE display 204 (e.g., a seat number of the IVE display). In some embodiments, each IVE display is associated with a unique identifier so that each IVE display can be uniquely identified. In some embodiments, the unique code may be a quick response (QR) code or a bar code.

At operation 306, the first lock/unlock module of the mobile device 202 can scan the unique code displayed on the IVE display using a camera of the module device 202. At operation 306, the first lock/unlock module of the mobile device 202 can open a web browser or a software application installed in the mobile device 202 to display the webpage of the address that is associated with the unique code. In some embodiments, the software application in the mobile device 202 may be registered to open the address when the first lock/unlock module scans and determines the address from the unique code.

The mobile device 202 and the server 302 are communicably coupled to a wireless access point in the passenger vehicle as explained in FIG. 1. At operation 308, the first lock/unlock module obtains and displays the webpage hosted on the server 302. The displayed webpage includes an icon to lock the IVE display associated with a seat number. The webpage may also include a hidden payload (e.g., PayloadA) that is obtained by the first lock/unlock module so that the first lock/unlock module can digitally sign the payload when exchanging information between the mobile device 202 and the server 302.

At operation 310, when the first lock/unlock module in the mobile device 202 determines that a person has selected the icon to lock the IVE display via the webpage displayed on the mobile device 202, the first lock/unlock module in the mobile device 202 sends a first message to the server 302 from the webpage whose address is unique to the IVE display and via a wireless access point. The first message comprises a digitally signed payload and a lock command to lock the IVE display 204. The first lock/unlock module in the mobile device 202 uses a secret key to digitally sign the payload and adds the digitally signed payload to the first message. The first lock/unlock module may generate and store the secret key in the mobile device 202 and only the first lock/unlock module may know or access the secret key. The secret key may be stored in the mobile device 202 in a local storage (e.g., memory) or in a cookie. The first lock/unlock module in the mobile device 202 can generate the digitally signed PayloadA by performing a mathematical calculation, such as by hashing PayloadA using the secret key. The output generated by the mathematical calculation can be considered a digitally signed PayloadA. After the digitally signed PayloadA is generated at operation 310, the first lock/unlock module generates the PayloadA and does not store (or discards) PayloadA on the mobile device.

At operation 312, a third lock/unlock module (shown as 725 in FIG. 7) of the server 302 saves the digitally signed payload received from the mobile device 202 and the server 302 sends a message to the IVE display 204 to lock the IVE display. The third lock/unlock module sends the message to the IVE display 204 using the address associated with the IVE display 204, which is determined by the third lock/unlock module from the address of the webpage indicated to the mobile device at operation 304. For example, the third lock/unlock module can determine, based on a look-up table, the IP address of the computer associated with the address of the IVE display and can send the message to the IP address at operation 312. The message comprises the lock command to lock the IVE display 204. At operation 313, the second lock/unlock module locks the IVE display 204 in response to receiving the message comprising the lock command.

At operation 314, when the IVE display 204 is locked, the IVE display may show an icon to unlock the IVE display. At operation 314, when the second lock/unlock module determines that a person has clicked on or touched the icon to unlock the IVE display, the second lock/unlock module can display the same unique code that was displayed at operation 304. At operation 316 and 318, the first lock/unlock module scans the unique code and opens the webpage associated with the address of the unique code. The webpage displayed on the module device 202 can show that the IVE display 204 is locked and can show an icon to unlock the IVE display 204. The displayed webpage includes a hidden payload that is the same as the hidden payload in the webpage displayed at operation 308.

At operation 320, when the first lock/unlock module determines that a person has touched the icon to unlock the IVE display, the first lock/unlock module retrieves the secret key stored on the mobile device 202, obtains the hidden payload from the webpage, digitally signs the payload, and sends a second message comprising the digitally signed payload and a second command to unlock the IVE module to the server 302 from the webpage whose address is unique to the IVE display and via the wireless access point. After the digitally signed PayloadA is generated at operation 320, the first lock/unlock module deletes the PayloadA and does not store (or discards) PayloadA on the mobile device.

At operations 304 and 314, the second lock/unlock module does not display a passcode or password for a user to enter. As mentioned in this patent document, one of the technical advantages of the example flowchart of FIG. 3 is that a passenger can lock and unlock the IVE display without entering a passcode or a password via the IVE display so that other passengers cannot easily lock and unlock the passenger's IVE display using the passcode or the password.

At operation 322, when the third lock/unlock module receives the second message and determines that the digitally signed payload received at operation 320 matches (e.g., is the same as) the digitally signed payload received at operation 310, the third lock/unlock module can send another message to the computer 204 to unlock the IVE display. The third lock/unlock module sends the another message to the IVE display 204 using the address of the IVE display 204, which is determined by the third lock/unlock module from the address of the webpage indicated to the mobile device at operation 314. The another message includes an unlock message to unlock the IVE display 204. At operation 322, the second lock/unlock module can unlock the IVE display in response to receiving the unlock command. At operation 323, the second lock/unlock module unlocks the IVE display 204 in response to receiving the another message comprising the unlock command.

After the IVE display 204 is unlocked at operation 322, if a person wants to lock the IVE display 204, the set of operations to re-lock the IVE display can start at operation 304. In some embodiments, the secret key that may be generated at operation 310 by the first lock/unlock module of the mobile device 202 when a person locks the IVE screen for a first time may be different than another secret key that may be generated at operation 310 by the first lock/unlock module of the mobile device 202 when the person locks the IVE screen for a second time that is later than the first time. Thus, in some embodiments, the secret key that may be generated by the first lock/unlock module can be different every time the operations for locking IVE display is performed.

In some embodiments, a main computer associated with a cabin crew can include an override module configured to control the plurality of seatback monitors. For example, if a passenger accidently locks a seatback monitor, the override module in the main computer can send a signal to unlock the particular seatback monitor by sending a unlock command to unlock to the particular seatback monitor. In some embodiments, the override module in the main computer can reset all of the plurality of seatback monitors by sending a reset command so that if at least some of the plurality of seatback monitors are locked, those locked seatback monitor(s) will be unlocked when the reset command is received.

FIG. 4A shows an example flowchart of operations performed by a computer and mobile device to lock and/or unlock a display on a commercial passenger vehicle. Operations 402 to 406 can be performed by a mobile device located in the commercial passenger vehicle and comprising a first processor configured to secure a display located in the commercial passenger vehicle, where the display is located behind a headrest of a seat in the commercial passenger vehicle. Operation 408 can be performed by a computer located in the commercial passenger vehicle, where the computer is communicably coupled with the display and comprises a second processor. Operation 402 includes obtaining a payload. Operation 404 includes generating a first digitally signed payload as a first output of a first mathematical computation performed on the payload with a secret key. Operation 406 includes sending a first message comprising the first digitally signed payload and a lock command to instruct the display to lock the display. Operation 408 includes sending a first instruction to cause the display to lock in response to a reception of the lock command.

In some embodiments, the mobile device comprising the first processor is further configured to: send, after the display is locked, a second message comprising a second digitally signed payload and an unlock command to instruct the display to unlock the display, where the second digitally signed payload is generated as a second output of a second mathematical computation performed on the payload with the secret key, where the first mathematical computation is performed at a first time that is earlier in time than a second time when the second mathematical computation is performed; and the computer comprising the second processor is further configured to: send a second instruction to cause the display to unlock in response to a reception of the unlock command. In some embodiments, the first processor of the mobile device is configured to not store or to discard the payload in the mobile device after the first digitally signed payload is generated.

In some embodiments, the first mathematical computation and the second mathematical computation includes a performance of a hash function using the payload the secret key. In some embodiments, when the display is locked, the second processor of the computer is configured to show on the display a volume adjustment menu to adjust an output volume of an audio or video content or to show on the display a brightness adjustment menu to adjust brightness of the display. In some embodiments, when the display is locked, the second processor of the computer is configured to show on the display a reading light control menu to control a light. In some embodiments, the payload is obtained from the computer by the first processor of the mobile device, the first processor being further configured to: transmit, using a first near field communication (NFC) device located in the mobile device, an application identifier (AID) to a second NFC device located in the display or located in another seat; and where the payload is obtained by the first NFC device from the second NFC device in response to the transmit the AID.

In some embodiments, the first message comprising the first digitally signed payload, the lock command, and the AID is sent by the first NFC device in the mobile device to the second NFC device in the display or in the another seat, and the second message comprising the second digitally signed payload, the unlock command, and the AID is sent by the first NFC device in the mobile device to the second NFC device in the display or in the another seat. In some embodiments, the display is caused to unlock by the second processor of the computer that is further configured to: receive the second message; and where the second instruction to cause the display to unlock is sent in response to the receive the unlock command and in response to a determination that the second digitally signed payload in the second message matches or is same as the first digitally signed payload in the first message. In some embodiments, the first NFC device is configured to operate in an NFC reader mode and the second NFC device is configured to operate in a host-based card emulation mode before the payload is obtained by the first NFC device.

In some embodiments, after the payload is obtained, the first NFC device is configured to operate in a host-based card emulation mode and the second NFC device is configured to operate in an NFC reader mode. In some embodiments, the payload is obtained from a server located in the commercial passenger vehicle by the first processor of the mobile device, the first processor being further configured to: scan a unique code displayed on the display, where the unique code provides an address of a webpage unique to the display; and cause a screen of the mobile device to show the webpage whose address is provided by the unique code, where the webpage is hosted on the server; where the payload is obtained from the webpage, and where the payload is hidden in the webpage. In some embodiments, the first message comprising the first digitally signed payload and the lock command is sent by the mobile device to the server from the address of the webpage that is unique to the display, and where the second message comprising the second digitally signed payload and the unlock command is sent is sent by the mobile device to the server from the address of the webpage that is unique to the display.

In some embodiments, the server includes a third processor that is configured to: receive, from the mobile device, the first message comprising the first digitally signed payload and the lock command; and send, in response to the receive the first message, a third message to the computer associated with the display, where the third message comprises the lock command, and where the third message is sent to the computer based on the address of the webpage that is unique to the display. In some embodiments, the server includes a third processor that is configured to: receive, from the mobile device, the second message comprising the second digitally signed payload and the unlock command; and send, upon determining that the second digitally signed payload matches or is same as the first digitally signed payload, a fourth message to the computer associated with the display, where the fourth message comprises the unlock command, and where the fourth message is sent to the computer based on the address of the webpage that is unique to the display.

FIG. 4B shows an example flowchart of operations performed by a computer to lock and/or unlock a display on a commercial passenger vehicle. Operation 452 to 458 can be performed by a processor in a computer configured to secure an in-vehicle entertainment (IVE) display. Operation 452 includes receiving, from a near field communication (NFC) device, a first message comprising a first digitally signed payload and a lock command to instruct a display to lock the display, where the computer and the display are located in a commercial passenger vehicle. Operation 454 includes sending a first instruction to cause the display to lock in response to a reception of the lock command. Operation 456 includes receiving, from the NFC device and after the display is locked, a second message comprising a second digitally signed payload and an unlock command to instruct the display to unlock the display. Operation 458 includes sending a second instruction to cause the display to unlock in response to a reception of an unlock command and in response to a determination that the second digitally signed payload in the second message matches the first digitally signed payload in the first message.

In some embodiments, the processor of the computer is configured to: receive an application identifier (AID) from a mobile device; and transmit, in response to the receive the AID, a payload to the mobile device, where the first digitally signed payload is a first output of a first mathematical computation that includes the payload and a secret key of the mobile device, and where the second digitally signed payload is a second output of a second mathematical computation that includes the payload and the secret key of the mobile device. In some embodiments, where the first message comprising the first digitally signed payload, the lock command, and the AID is received by the NFC device, and the second message comprising the second digitally signed payload, the unlock command, and the AID is received by the NFC device. In some embodiments, when the display is locked, the processor of the computer is further configured to show on the display a volume adjustment menu to adjust an output volume of an audio or video content or to show on the display a brightness adjustment menu to adjust brightness of the display. In some embodiments, the second digitally signed payload in the second message is determined to match the first digitally signed payload in the first message by the processor configured to determine that the second digitally signed payload is same as the first digitally signed payload.

Figure 5:
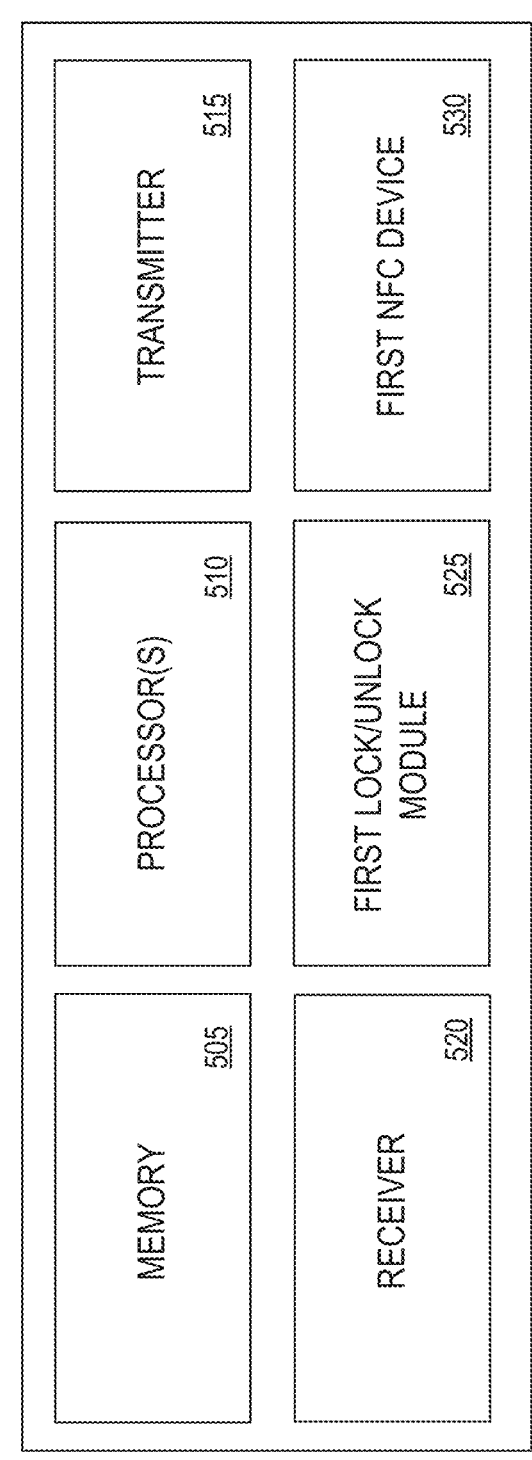
FIG. 5 shows an exemplary block diagram of a mobile device.

FIG. 5 shows an exemplary block diagram of a mobile device. The mobile device 202 includes at least one processor 510 and a memory 505 having instructions stored thereupon. The instructions upon execution by the processor 510 configure the mobile device 202 to perform operations described in FIGS. 1 to 4, and to perform the operations described for the first lock/unlock module 525 and/or for the first NFC device 530. The instructions upon execution by the processor 510 can also configure the mobile device 202 to perform the operations described in the various embodiments described in this patent document. The transmitter 515 transmits or sends information or data to another device (e.g., the server). The receiver 520 receives information from another device (e.g., the server).

Figure 6:
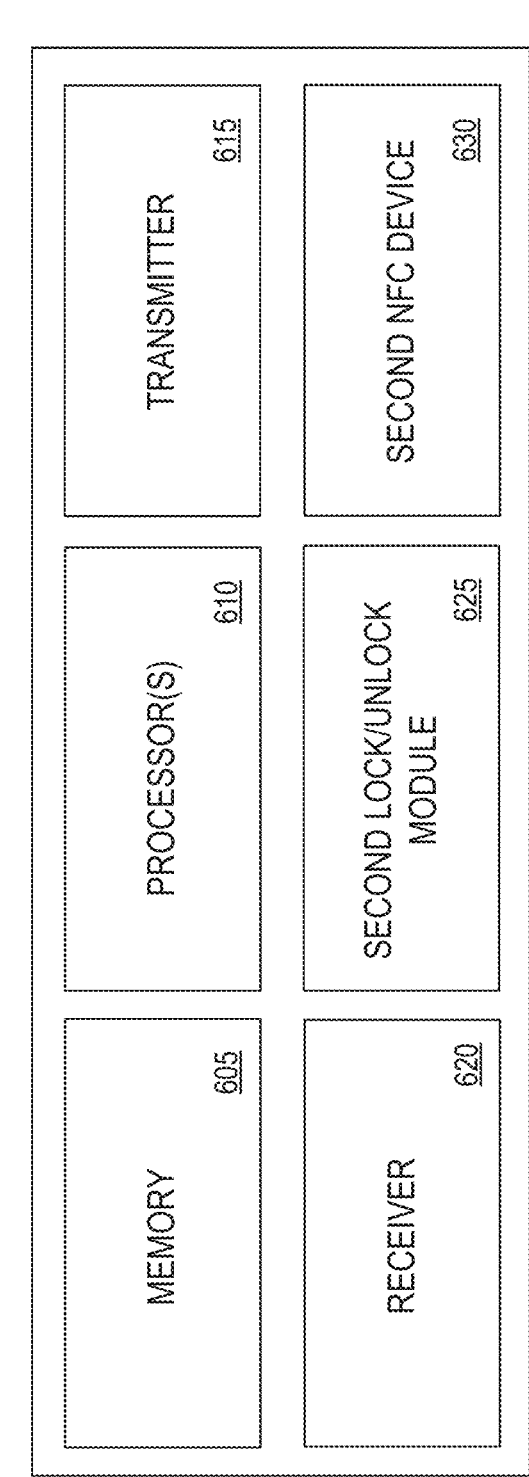
FIG. 6 shows an exemplary block diagram of a computer associated with an IVE display.

FIG. 6 shows an exemplary block diagram of a computer associated with an IVE display. The computer 204 includes at least one processor 610 and a memory 605 having instructions stored thereupon. The instructions upon execution by the processor 610 configure the computer 204 to perform operations described in FIGS. 1 to 4, and to perform the operations described for the second lock/unlock module 625 and/or for the second NFC device 630. The instructions upon execution by the processor 610 can also configure the computer 204 to perform the operations described in the various embodiments described in this patent document. The transmitter 615 transmits or sends information or data to another device (e.g., to the server or the mobile device). The receiver 320 receives information from another device (e.g., from the server or the mobile device).

Figure 7:
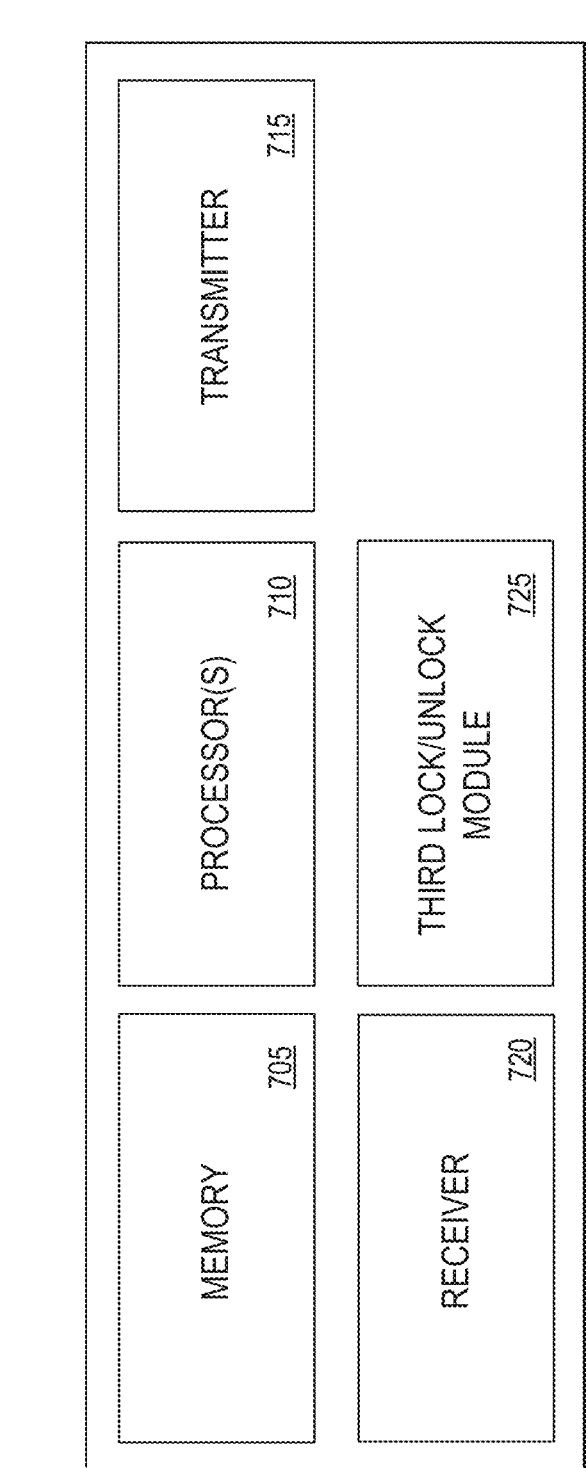
FIG. 7 shows an exemplary block diagram of a server located in a commercial passenger vehicle.

FIG. 7 shows an exemplary block diagram of a server located in a commercial passenger vehicle. The server 302 includes at least one processor 710 and a memory 705 having instructions stored thereupon. The instructions upon execution by the processor 710 configure the server 302 to perform operations described in FIGS. 1 and 3 to 4, and to perform the operations described for the third lock/unlock module 725. The instructions upon execution by the processor 710 can also configure the server 302 to perform the operations described in the various embodiments described in this patent document. The transmitter 715 transmits or sends information or data to another device (e.g., to the compute associated with the IVE display or to the mobile device). The receiver 320 receives information from another device (e.g., from the computer associated with the IVE display or from the mobile device).

This patent document describes the exemplary techniques to lock and unlock IVE displays in the context of a commercial passenger vehicle such as an airplane for case of description. The exemplary test system could be used to lock and unlock monitors or other display devices in other types of commercial passenger vehicle such as a train, a ship, or a bus.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for securing an in-vehicle entertainment (IVE) display in a commercial passenger vehicle, the system comprising:
   one or more processors, coupled to the IVE display located behind a headrest of a seat in the commercial passenger vehicle, configured to:
   receive, from a mobile device, a first message comprising a first digitally signed payload and a lock command to instruct the IVE display to lock itself, and
   transmit, to the IVE display, the lock command,
   wherein the first digitally signed payload is a first output of a first mathematical computation performed on a payload with a secret key, and
   wherein the IVE display is configured to lock in response to a reception of the lock command.

2. The system of claim 1, wherein the mobile device is configured to:
   obtain the payload; and
   perform the first mathematical computation to generate the first output.

3. The system of claim 2, wherein performing the first mathematical computation comprises performing a hash function using the payload and the secret key.

4. The system of claim 2,
   wherein the mobile device is further configured to:
   perform a second mathematical computation on the payload with the secret key to generate a second digitally signed payload, and
   transmit, to the one or more processors and after the IVE display is locked, a second message comprising the second digitally signed payload and a unlock command to instruct the IVE display to unlock itself,
   wherein the first mathematical computation is performed at a first time that is earlier in time than a second time when the second mathematical computation is performed;
   wherein the one or more processors is further configured to:
   transmit, to the IVE display, the unlock command; and
   wherein the IVE display is configured to unlock in response to a reception of the unlock command.

5. The system of claim 4, wherein the mobile device is configured to not store or to discard the first digitally signed payload subsequent to transmitting the first message.

6. The system of claim 4, wherein performing the second mathematical computation comprises performing a hash function using the payload and the secret key.

7. The system of claim 1, wherein, when the IVE display is locked, the one or more processors is configured to display a volume adjustment menu or a brightness adjustment menu on the IVE display, wherein the volume adjustment menu enables an output volume of an audio or video content to be adjusted, and wherein the brightness adjustment menu enables a brightness of the IVE display to be adjusted.

8. The system of claim 1, wherein, when the IVE display is locked, the one or more processors is configured to display a reading light control menu on the IVE display to control a light above the seat.

9. A method for securing an in-vehicle entertainment (IVE) display, implemented by one or more processors coupled to the IVE display, the method comprising:
   receiving, from a mobile device, a first message comprising a first digitally signed payload and a lock command to instruct the IVE display to lock itself; and
   transmitting, to the IVE display, the lock command,
   wherein the first digitally signed payload is a first output of a first mathematical computation performed on a payload with a secret key, and
   wherein the IVE display is configured to lock in response to a reception of the lock command.

10. The method of claim 9, wherein the mobile device is further configured to:
    transmit, using a first near field communication (NFC) device in the mobile device, an application identifier (AID) to a second NFC device coupled to the one or more processors; and
    receive, from the second NFC device, the payload,
    wherein the one or more processors is configured to transmit the payload to the mobile device in response to a reception of the AID.

11. The method of claim 10, wherein the first message further comprises the AID.

12. The method of claim 10, further comprising:

receiving, from the mobile device, a second message comprising a second digitally signed payload and an unlock command to instruct the IVE display to unlock itself; and transmitting, upon determining that the second digitally signed payload matches or is same as the first digitally signed payload, the unlock command to the IVE display.

13. The method of claim 12, wherein the second message further comprises the AID.

14. The method of claim 10, wherein, prior to the mobile device receiving the payload, the first NFC device is configured to operate in an NFC reader mode and the second NFC device is configured to operate in a host-based card emulation mode.

15. A method of securing an in-vehicle entertainment (IVE) display, implemented by one or more processors coupled to the IVE display, the method comprising:

receiving, from a near field communication (NFC) device, a first message comprising a first digitally signed payload and a lock command to instruct the IVE display to lock itself;

transmitting a first instruction to cause the IVE display to lock in response to a reception of the lock command;

receiving, from the NFC device and after the IVE display is locked, a second message comprising a second digitally signed payload and an unlock command to instruct the IVE display to unlock itself; and transmitting a second instruction to cause the IVE display to unlock in response to (a) a reception of an unlock command and (b) a determination that the second digitally signed payload in the second message matches the first digitally signed payload in the first message.

16. The method of claim 15, wherein the first digitally signed payload is generated as a first output of a first mathematical computation performed on a payload with a secret key, wherein the second digitally signed payload is generated as a second output of a second mathematical computation performed on the payload with the secret key, and wherein the payload is obtained from a server coupled to the IVE display.

17. The method of claim 16, wherein the NFC device is part of a mobile device, and wherein the mobile device is configured to:

scan a unique code displayed on the IVE display, wherein the unique code provides an address of a webpage unique to the IVE display; and cause a screen of the mobile device to display the webpage based on the address provided by the unique code, wherein the webpage is hosted on the server, and wherein the payload is obtained from the webpage.

18. The method of claim 17, wherein the unique code is a quick response (QR) code.

19. The method of claim 16, wherein the first mathematical computation and the second mathematical computation are performed using a hash function.

20. The method of claim 15, wherein the second digitally signed payload is determined to match the first digitally signed payload when the second digitally signed payload is same as the first digitally signed payload.

\* \* \* \* \*